United States Patent
Egashira et al.

(10) Patent No.: US 10,347,426 B2
(45) Date of Patent: Jul. 9, 2019

(54) CHIP-SHAPED ELECTRONIC COMPONENT

(71) Applicant: Murata Manufacturing Co., Ltd., Nagaokakyo-shi, Kyoto-fu (JP)

(72) Inventors: Kazunori Egashira, Nagaokakyo (JP); Kazunori Kunimoto, Nagaokakyo (JP); Seiji Katsuta, Nagaokakyo (JP); Yosuke Terashita, Nagaokakyo (JP); Takayoshi Yamamoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/480,511

(22) Filed: Apr. 6, 2017

(65) Prior Publication Data
US 2018/0068792 A1 Mar. 8, 2018

(30) Foreign Application Priority Data
Sep. 5, 2016 (JP) ................................ 2016-172853

(51) Int. Cl.
| | |
|---|---|
| *H01G 4/248* | (2006.01) |
| *H01B 1/02* | (2006.01) |
| *H01G 4/30* | (2006.01) |
| *H01G 4/12* | (2006.01) |
| *H01G 4/232* | (2006.01) |

(52) U.S. Cl.
CPC ............ *H01G 4/248* (2013.01); *H01B 1/02* (2013.01); *H01G 4/12* (2013.01); *H01G 4/232* (2013.01); *H01G 4/30* (2013.01)

(58) Field of Classification Search
CPC ............. H01G 4/248; H01G 4/30; H01B 1/02
USPC ....................................................... 361/306.3
See application file for complete search history.

(56) References Cited

U.S. PATENT DOCUMENTS

| | | | | |
|---|---|---|---|---|
| 9,706,641 | B1* | 7/2017 | Park ......................... | H01G 4/30 |
| 2014/0292142 | A1* | 10/2014 | Nishisaka ................. | C03C 8/18 |
| | | | | 310/311 |
| 2015/0085422 | A1* | 3/2015 | Kim ...................... | H01G 4/2325 |
| | | | | 361/301.4 |

(Continued)

FOREIGN PATENT DOCUMENTS

| | | | |
|---|---|---|---|
| JP | 10-284343 A | | 10/1998 |
| JP | 2008181956 A | * | 8/2008 |
| JP | 2010-226017 A | | 10/2010 |

*Primary Examiner* — Michael P McFadden
(74) *Attorney, Agent, or Firm* — Keating & Bennett, LLP (57) ABSTRACT

An external electrode includes an underlying electrode layer on an end surface of a ceramic body and connected to an internal electrode, an external electrode layer located outside the underlying electrode layer, and an intermediate electrode layer including at least a portion between the underlying electrode layer and the external electrode layer. The intermediate electrode layer includes a conductive resin, and the underlying electrode layer and the external electrode layer include a material lower in electrical resistivity than the conductive resin. The intermediate electrode layer entirely or substantially entirely covers the end surfaces and extends from the end surfaces to portions, respectively, of one main surface, and the underlying electrode layer is partially exposed from the intermediate electrode layer to include an exposed surface and is in surface-contact with the external electrode layer at the exposed surface.

19 Claims, 9 Drawing Sheets

(56) References Cited

U.S. PATENT DOCUMENTS

| | | | |
|---|---|---|---|
| 2016/0071647 A1* | 3/2016 | Nishisaka | H01G 4/30 361/301.4 |
| 2016/0090661 A1* | 3/2016 | Kitada | H01C 1/1406 338/22 R |
| 2016/0381802 A1* | 12/2016 | Taniguchi | H01G 4/008 174/260 |

* cited by examiner

CHIP-SHAPED ELECTRONIC COMPONENT

CROSS REFERENCE TO RELATED APPLICATIONS

This application claims the benefit of priority to Japanese Patent Application No. 2016-172853 filed on Sep. 5, 2016. The entire contents of this application are hereby incorporated herein by reference.

BACKGROUND OF THE INVENTION

1. Field of the Invention

The present invention relates to a chip-shaped electronic component, and particularly to a structure of an external electrode in the chip-shaped electronic component.

2. Description of the Related Art

A known technique is described for example in Japanese Patent Laying-Open No. 10-284343. FIG. 1 of Japanese Patent Laying-Open No. 10-284343 is shown in FIG. 9 of the present application.

Figure 9:
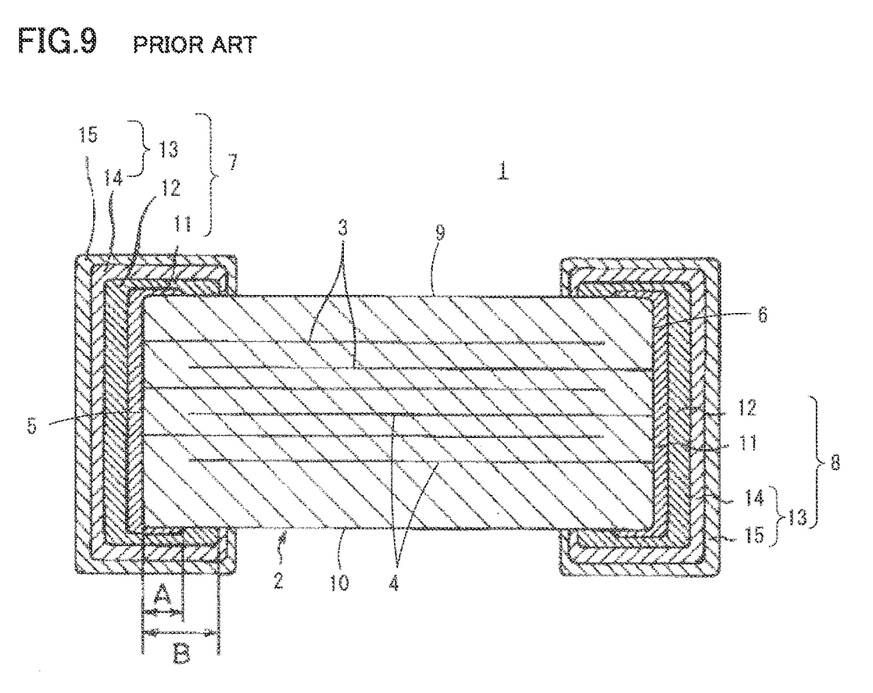
FIG. 9 is a cross section of a chip-shaped electronic component described in Japanese Patent Laying-Open No. 10-284343.

With reference to FIG. 9 of the present application, a chip-shaped electronic component 1 configures a multilayer ceramic capacitor and includes a ceramic body 2 in the form of a rectangular parallelepiped. Ceramic body 2 has a multilayer structure and an inside of the ceramic body 2 includes a plurality of internal electrodes 3 and 4 defining an internal conductor are disposed in layers.

Internal electrodes 3 and 4 are grouped into a first internal electrode 3 and a second internal electrode 4, and first internal electrode 3 and second internal electrode 4 are alternately disposed in a direction in which the layers are deposited. First internal electrode 3 is drawn out to a first end surface 5 of ceramic body 2, and second internal electrode 4 is drawn out to a second end surface 6 opposite to first end surface 5 of ceramic body 2.

A first external electrode 7 is formed on first end surface 5 of ceramic body 2, and a second external electrode 8 is formed on second end surface 6. Furthermore, first external electrode 7 is also formed to extend from first end surface 5 to a portion of each of first and second main surfaces 9 and 10 adjacent to first end surface 5 and a portion of each of first and second side surfaces adjacent to first end surface 5 (i.e., surfaces which extend parallel to the plane of the sheet of FIG. 9, although not shown in the figure). Furthermore, second external electrode 8 is formed to extend from second end surface 6 to a portion of each of first and second main surfaces 9 and 10 adjacent to second end surface 6 and a portion of each of the first and second side surfaces adjacent to second end surface 6.

First and second external electrodes 7 and 8 both have a sintered electrode layer 11 formed on first and second end surfaces 5 and 6, respectively, of ceramic body 2 and electrically connected to internal electrodes 3 and 4, respectively, a conductive resin electrode layer 12 formed thereon, and a plating electrode layer 13 formed thereon. Plating electrode layer 13 is composed of a Ni plating coating 14 and a Sn or Sn/Pb plating coating 15 thereon.

The technique described in Japanese Patent Laying-Open No. 10-284343 attempts to solve a problem of a possibility of cracking ceramic body 2 in a heat cycle when using chip-shaped electronic component 1 by conductive resin electrode layer 12 that is formed in external electrodes 7 and 8 alleviating a stress caused in ceramic body 2.

Furthermore, the technique described in Japanese Patent Laying-Open No. 10-284343 is characterized in that sintered electrode layer 11 has a length A to extend around and conductive resin electrode layer 12 has a length B to extend around, length A being length B multiplied by 0.7 or less. From this, a configuration in which conductive resin electrode layer 12 must completely cover sintered electrode layer 11 can be derived.

However, when conductive resin electrode layer 12 completely covers sintered electrode layer 11, as described above, external electrodes 7 and 8 have an increased electrical resistance, and chip-shaped electronic component 1 would have an increased equivalent series resistance or similar impaired electrical characteristics would be invited.

In order to solve the above problem, for example, Japanese Patent Laying-Open No. 2010-226017 proposes the following technique. FIG. 3 of Japanese Patent Laying-Open No. 2010-226017 is shown in FIG. 10 of the present application.

Figure 10:
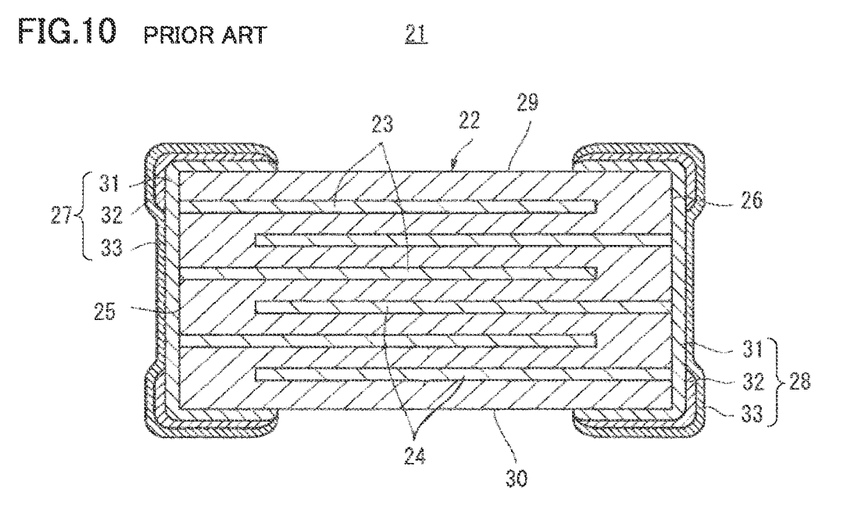
FIG. 10 is a cross section of a chip-shaped electronic component described in Japanese Patent Laying-Open No. 2010-226017.

With reference to FIG. 10, a chip-shaped electronic component 21, as well as chip-shaped electronic component 1 shown in FIG. 9, defines a multilayer ceramic capacitor, and includes a ceramic body 22 in the form of a rectangular parallelepiped. Ceramic body 22 has a multilayer structure and inside ceramic body 22, a plurality of first internal electrodes 23 and a plurality of second internal electrodes 24 defining internal conductors, respectively, are disposed in layers.

First internal electrode 23 and second internal electrode 24 are alternately disposed in a direction in which the layers are deposited. First internal electrode 23 is drawn out to a first end surface 25 of ceramic body 22, and second internal electrode 24 is drawn out to a second end surface 26 opposite to first end surface 25 of ceramic body 22.

A first external electrode 27 is formed on first end surface 25 of ceramic body 22, and a second external electrode 28 is formed on second end surface 26. Furthermore, first external electrode 27 is also formed to extend from first end surface 25 to a portion of each of first and second main surfaces 29 and 30 adjacent to first end surface 25 and a portion of each of first and second side surfaces adjacent to first end surface 25 (i.e., surfaces which extend parallel to the plane of the sheet of FIG. 10, although not shown in the figure). Furthermore, second external electrode 28 is formed to extend from second end surface 26 to a portion of each of first and second main surfaces 29 and 30 adjacent to second end surface 26 and a portion of each of the first and second side surfaces adjacent to second end surface 26.

First and second external electrodes 27 and 28 both have a baked electrode layer 31 formed on first and second end surfaces 25 and 26, respectively, of ceramic body 22 and electrically connected to internal electrodes 23 and 24, respectively, a conductive resin electrode layer 32 formed thereon, and a plating electrode layer 33 formed thereon.

With the technique described in Japanese Patent Laying-Open No. 2010-226017, conductive resin electrode layer 32 at a portion opposite to end surfaces 25 and 26 of the ceramic body has a so-called "window" formed herein, and plating electrode layer 33 is in surface-contact with baked electrode layer 31 at the portion of the "window." This provides external electrodes 27 and 28 with a current path which does not pass through conductive resin electrode layer 32, which has a relatively high electrical resistance, and can prevent chip-shaped electronic component 21 from having an impaired electrical characteristic.

Furthermore, Japanese Patent Laying-Open No. 2010-226017 describes that conductive resin electrode layer 32 acts to alleviate a stress caused in ceramic body 22 and hence prevents ceramic body 22 from cracking.

Figure 11:
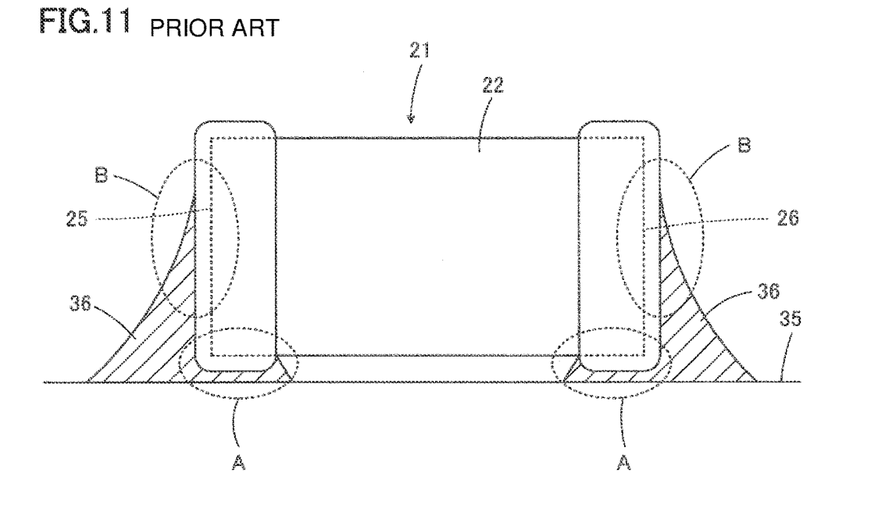
FIG. 11 shows a state in which the chip-shaped electronic component shown in FIG. 10 is mounted on a mounting substrate.

FIG. 11 schematically shows chip-shaped electronic component 21 of Japanese Patent Laying-Open No. 2010-226017 mounted on a mounting substrate 35. Chip-shaped electronic component 21 and mounting substrate 35 are connected electrically and mechanically via a solder fillet 36.

In the state shown in FIG. 11, for example, when mounting substrate 35 flexes, a stress resulting therefrom is exerted to solder fillet 36 and hence ceramic body 22 via solder fillet 36. At the time, at a portion A of ceramic body 22 facing mounting substrate 35, the stress via solder fillet 36 is effectively alleviated by the presence of conductive resin electrode layer 32 (see FIG. 10).

In contrast, at a portion B of ceramic body 22 in a vicinity of end surfaces 25 and 26, there is no or substantially no conductive resin electrode layer 32 (see FIG. 10) present, and accordingly, it is difficult to sufficiently alleviate the stress exerted via solder fillet 36. This may result in ceramic body 22 cracking.

SUMMARY OF THE INVENTION

Preferred embodiments of the present invention provide a chip-shaped electronic component which is able to reduce electrical resistance in an external electrode and also enhance endurance against stress.

According to a preferred embodiment of the present invention, a chip-shaped electronic component includes a ceramic body with a rectangular parallelepiped or a substantially rectangular parallelepiped shape including mutually opposite first and second main surfaces, mutually opposite first and second side surfaces, and mutually opposite first and second end surfaces. The second main surface is a surface that faces a mounting substrate when the chip-shaped electronic component is mounted to the mounting substrate. Each of the main surfaces, each of the side surfaces, and each of the end surfaces are orthogonal or substantially orthogonal to one another. The chip-shaped electronic component further includes an internal conductor provided inside the ceramic body and first and second external electrodes that are provided on the first and second end surfaces, respectively, of the ceramic body and extend from the first and second end surfaces, respectively, to at least the second main surface adjacent to or in a vicinity of the first and second end surfaces, respectively.

Each of the first and second external electrodes includes an underlying electrode layer formed at least on the first and second end surfaces, respectively, of the ceramic body and electrically connected to the internal conductor, an external electrode layer located outside the underlying electrode layer, and an intermediate electrode layer including at least a portion located between the underlying electrode layer and the external electrode layer.

The intermediate electrode layer includes a conductive resin including a resin component and a conductive metal component, and the underlying electrode layer and the external electrode layer include a material lower in electrical resistivity than the conductive resin.

In a chip-shaped electronic component described above, the intermediate electrode layer entirely or substantially entirely covers each of the first and second end surfaces and extends from the first and second end surfaces to portions, respectively, of at least the second main surface, and the underlying electrode layer is partially exposed from the intermediate electrode layer to include an exposed surface and is in surface-contact with the external electrode layer at the exposed surface.

The intermediate electrode layer includes a conductive resin, entirely or substantially entirely covers each of the first and second end surfaces, and extends from the first and second end surfaces to portions, respectively, of at least the second main surface. The intermediate electrode layer defines and functions as a buffer layer that significantly reduces or prevents stress when the chip-shaped electronic component is mounted. Furthermore, the exposed surface exposed in the underlying electrode layer from the intermediate electrode layer, which is in surface-contact with the external electrode layer, defines a current path which does not pass through the intermediate electrode layer and which has a relatively high electrical resistance.

In a preferred embodiment of the present invention, the underlying electrode layer is a baked layer or a thin film layer. Accordingly, the underlying electrode layer is able to be provided with a relatively low electrical resistance.

Preferably, the external electrode layer is a plating layer, for example. Accordingly, the external electrode layer is able to be provided with a relatively low electrical resistance.

The external electrode layer preferably covers an area in which at least one of the underlying electrode layer and the intermediate electrode layer is formed, for example. When the external electrode layer is formed by plating, the external electrode layer preferably covers an area in which at least one of the underlying electrode layer and the intermediate electrode layer is provided, for example. Accordingly, when performing a plating process, for example, it is not necessary to mask a particular portion and the plating process is able to be efficiently performed.

In a preferred embodiment of the present invention, the ceramic body includes a multilayer structure in which a plurality of internal conductors are disposed in layers. The multilayer structure of the ceramic body is provided, for example, in a multilayer electronic component. One example of the multilayer electric component is a multilayer ceramic capacitor.

According to preferred embodiments of the present invention, two arrangements are able to be provided for the surface contact structure of the underlying electrode layer and the external electrode layer, as described below.

In a first arrangement according to a preferred embodiment of the present invention, the underlying electrode layer extends from the first and second end surfaces to portions, respectively, of each of the first and second side surfaces that are adjacent to or in a vicinity of the first and second end surfaces, respectively; the intermediate electrode layer extends from the first and second end surfaces to the portions, respectively, of each of the first and second side surfaces that are adjacent to or in a vicinity of the first and second end surfaces, respectively; and the exposed surface of the underlying electrode layer is at least partially provided at portions located on the first and second side surfaces, respectively, and the underlying electrode layer is in surface-contact with the external electrode layer on the first and second side surfaces.

In the first arrangement, preferably, the portions of the intermediate electrode layer extending to the portions, respectively, of each of the first and second side surfaces each include a length, as measured in a direction connecting the first and second end surfaces, that increases as observed in a direction from the first main surface toward the second main surface, for example.

In the first arrangement, preferably, each of the portions of the intermediate electrode layer extending to the portions, respectively, of each of the first and second side surfaces includes a long portion, as measured in the direction connecting the first and second end surfaces, that projects from the underlying electrode layer. Accordingly, the external electrode does not include a symmetrical shape, and the surface the ceramic body corresponding to the second main surface is able to be easily determined by visual observation of the external electrode. Thus, a surface that is desired to face the mounting substrate to be determined quickly and reliably in the step of mounting the chip-shaped electronic component is provided.

In a second arrangement according to a preferred embodiment of the present invention, the underlying electrode layer extends from the first and second end surfaces to those portions, respectively, of the first main surface that are adjacent to or in a vicinity of the first and second end surfaces, respectively, and the exposed surface of the underlying electrode layer is at least partially provided at a portion located on the first main surface and the underlying electrode layer is in surface-contact with the external electrode layer on the first main surface.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 6A1 to 6C show a chip-shaped electronic component according to a third preferred embodiment of the present invention, and show a process for forming external electrodes of the chip-shaped electronic component.

FIGS. 7A1 to 7B show a process for forming an underlying electrode layer on the ceramic body shown in FIGS. 6A1 and 6A2. FIG. 7A1 shows a first step for providing a conductive paste to define and function as the underlying electrode layer, as observed from the side of a main surface, FIG. 7A2 shows the first step of FIG. 7A1 from above.

FIGS. 8A and 8B show a process for forming an underlying electrode layer on a ceramic body a fourth preferred embodiment of the present invention.

DETAILED DESCRIPTION OF THE PREFERRED EMBODIMENTS

Hereinafter, the present invention will be clarified through description of specific preferred embodiments of the present invention with reference to the drawings.

It is to be noted that the preferred embodiments described in this specification are merely examples, and that the configurations in the preferred embodiments are able to be partly replaced or combined between different preferred embodiments.

First Preferred Embodiment

Figure 1A:
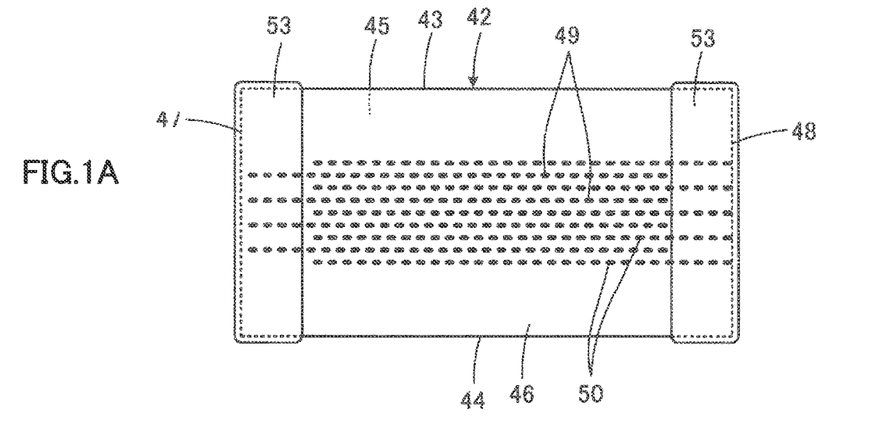
FIGS. 1A to 1C are side views of a chip-shaped electronic component according to a first preferred embodiment of the present invention, and show a process for forming external electrodes of the chip-shaped electronic component.
Figure 1B:
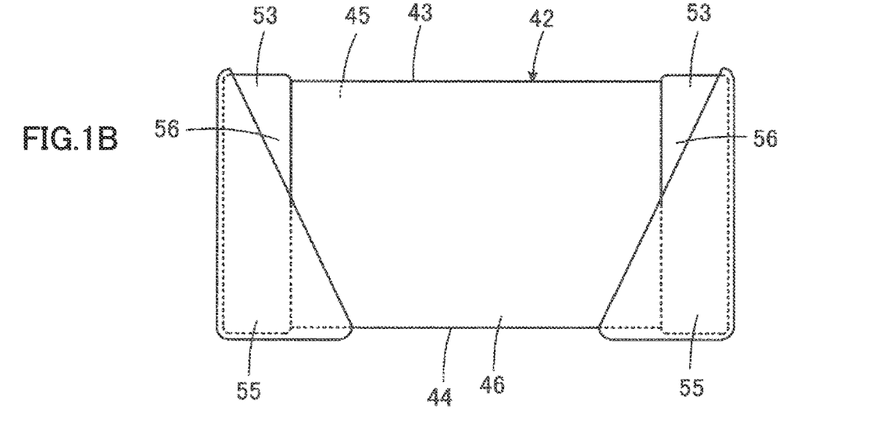
Figure 1C:
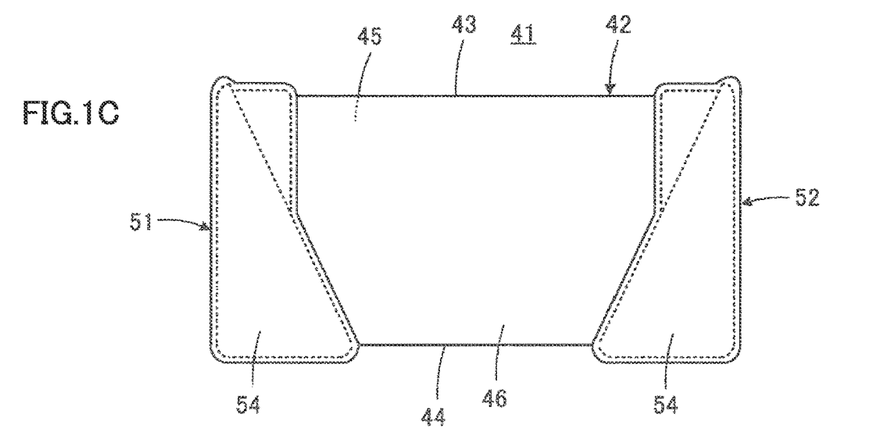
Figure 2:
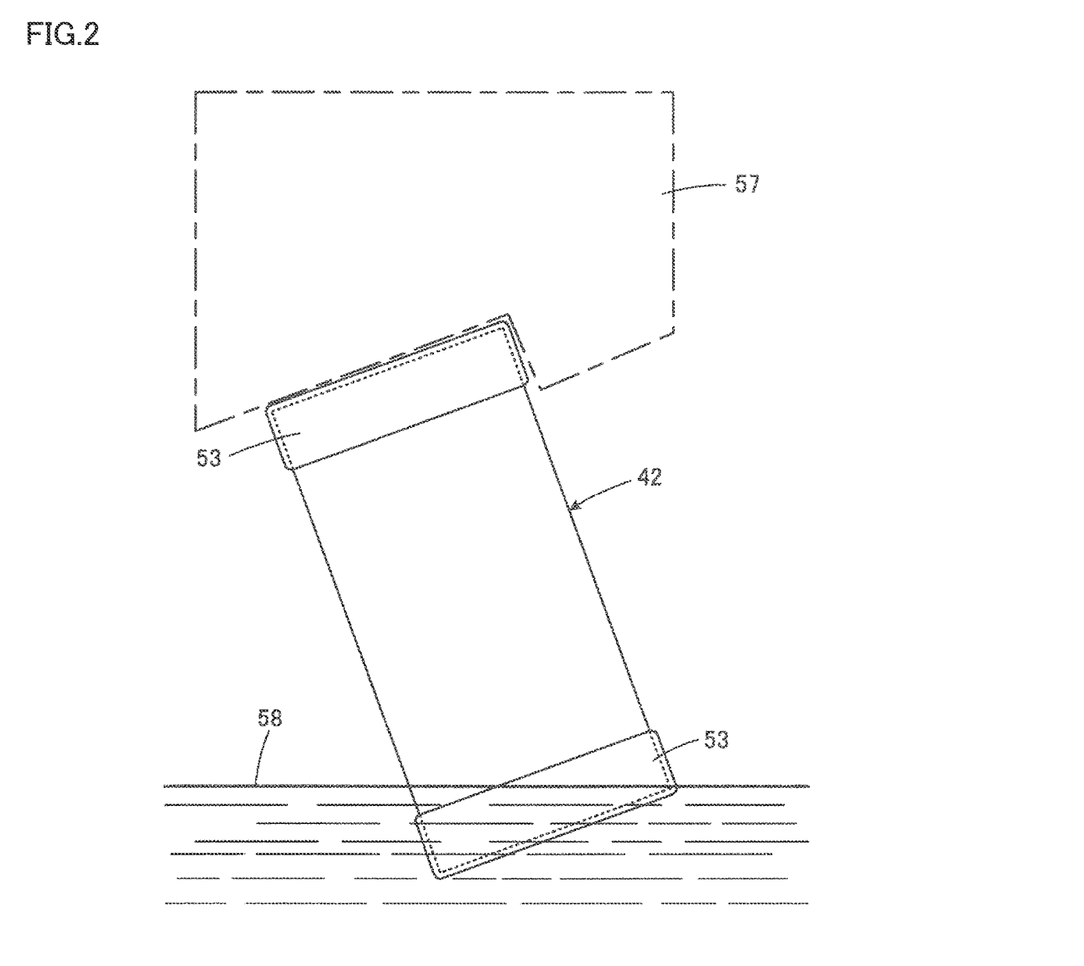
FIG. 2 is a side view showing a step of forming an intermediate electrode layer.

With reference to FIG. 1A to FIG. 2, a chip-shaped electronic component 41 according to a first preferred embodiment of the present invention is described below. FIGS. 1A and 1B show states in a process of producing the chip-shaped electronic component 41, and FIG. 1C shows the chip-shaped electronic component 41 as a finished product.

The chip-shaped electronic component 41 defines a multilayer ceramic capacitor and includes a ceramic body 42. The ceramic body 42 includes mutually opposite first and second main surfaces 43 and 44, mutually opposite first and second side surfaces 45 and 46, and mutually opposite first and second end surfaces 47 and 48. Each of the main surfaces 43 and 44, each of the side surfaces 45 and 46, and each of the end surfaces 47 and 48 are orthogonal or substantially orthogonal to one another, and the ceramic body 42 thus has a rectangular parallelepiped or a substantially rectangular parallelepiped shape, for example. As described herein, when a rectangular parallelepiped or a substantially rectangular parallelepiped shape is referred to, it also includes a rectangular parallelepiped or a substantially rectangular parallelepiped shape, for, example includes a ridge, a corner, and/or the like radially chamfered.

The ceramic body 42 includes a multilayer structure, and an interior of the ceramic body 42, as indicated in FIG. 1A by a broken line, includes an internal conductor defined by a plurality of internal electrodes 49 and a plurality of internal electrodes 50 disposed in layers. The internal electrodes 49 and 50 are grouped into a first internal electrode 49 and a second internal electrode 50, and the first internal electrode 49 and second internal electrode 50 are alternately disposed in a direction in which the layers are deposited. The first internal electrode 49 is drawn out to the first end surface 47 of the ceramic body 42, and the second internal electrode 50 is drawn out to the second end surface 48 of the ceramic body 42.

A first external electrode 51 is provided on the first end surface 47 of the ceramic body 42, and a second external electrode 52 is provided on the second end surface 48. Furthermore, the first external electrode 51 extends from the first end surface 47 to a portion of each of the first and second main surfaces 43 and 44 adjacent to or in a vicinity of the first end surface 47 and a portion of each of the first and second side surfaces 45 and 46 adjacent to or in a vicinity of the first end surface 47. Furthermore, the second external electrode 52 extends from the second end surface 48 to a portion of each of the first and second main surfaces 43 and 44 adjacent to or in a vicinity of the second end surface 48 and a portion of each of the first and second side surfaces 45 and 46 adjacent to or in a vicinity of the second end surface 48.

The first and second external electrodes 51 and 52 both include an underlying electrode layer 53 provided on the first and second end surfaces 47 and 48, respectively, of the ceramic body 42 and electrically connected to the internal electrodes 49 and 50, respectively, an external electrode layer 54 located outside the underlying electrode layer 53, and an intermediate electrode layer 55 including at least a portion located between the underlying electrode layer 53 and the external electrode layer 54.

FIG. 1A shows a state after the underlying electrode layer 53 is formed, FIG. 1B shows a state after the intermediate electrode layer 55 is formed outside the underlying electrode layer 53, and FIG. 1C shows a state after the external electrode layer 54 is formed outside the underlying electrode layer 53 and the intermediate electrode layer 55.

More specifically, as shown in FIG. 1A, the underlying electrode layer 53 extends from the first and second end surfaces 47 and 48 to those portions, respectively, of each of the first and second main surfaces 43 and 44 which are adjacent to or in a vicinity of the first and second end surfaces 47 and 48, respectively, and those portions, respectively, of each of the first and second side surfaces 45 and 46 which are adjacent to or in a vicinity of the first and second end surfaces 47 and 48, respectively. The underlying electrode layer 53 is a baked layer or a thin film layer, for example.

When the underlying electrode layer 53 is a baked layer, the baked layer includes glass and a metal. The metal included in the baked layer is, for example, at least one selected from Cu, Ni, Ag, Pd, an Ag—Pd alloy, and Au. The baked layer may include a plurality of layers. The baked layer is formed by applying a conductive paste including glass and a metal to a prescribed area including the end surfaces 47 and 48 of the ceramic body 42, and baking the paste. The baked layer may be formed being firing simultaneously with the ceramic body 42 and the internal electrodes 49 and 50, or by baking after the ceramic body 42 and the internal electrodes 49 and 50 are fired.

When the underlying electrode layer 53 is a thin film layer, it is formed by a thin film formation method, for example, plating or sputtering. As an example, the thin film layer is a layer of metal particles deposited to provide a thickness of about 1 μm or less.

The intermediate electrode layer 55 entirely or substantially entirely covers each of the first and second end surfaces 47 and 48, and to extend from the first and second end surfaces 47 and 48 to those portions, respectively, of the second main surface 44 which are adjacent to or in a vicinity of the first and second end surfaces 47 and 48, respectively, as shown in FIG. 1B. The second main surface 44 is a surface which is desired to the face mounting substrate 35 when the chip-shaped electronic component 41 is mounted.

Furthermore, the intermediate electrode layer 55 extends from the first and second end surfaces 47 and 48 to those portions, respectively, of each of the first and second side surfaces 45 and 46 which are adjacent to or in a vicinity of the first and second end surfaces 47 and 48, respectively. More specifically, each of the portions of the intermediate electrode layer 55 extending to the portions, respectively, of each of the first and second side surfaces 45 and 46, defines a right-angled or substantially right-angled triangle, as shown in FIG. 1B, and each of the portions of the intermediate electrode layer 55 extending to the portions, respectively, of each of the first and second side surfaces 45 and 46, include a width, as measured in a direction connecting the first and second end surfaces 47 and 48, that increases in a direction from the first main surface 43 toward the second main surface 44.

The underlying electrode layer 53 described above includes a portion exposed from the intermediate electrode layer 55, i.e., an exposed surface 56. In the first preferred embodiment, exposed surface 56 of the underlying electrode layer 53 is at least partially provided at portions located on the first and second side surfaces 45 and 46, respectively.

The intermediate electrode layer 55 includes a conductive resin which includes a resin component, for example, a thermosetting resin, and a conductive metal component. The underlying electrode layer 53 and the external electrode layer 54 include a material lower in electrical resistivity than the conductive resin. The conductive metal component included in the conductive resin, that is, a conductive filler, is not specifically limited in shape, and it may have any shape, for example, a spherical shape, a flat shape, or the like. The metal component's average particle diameter is not limited to any specific value, either. As an example, a metal component with an average particle diameter of about 0.3 μm or more and about 10 μm or less is preferably used.

Since the conductive resin defining the intermediate electrode layer 55 includes a resin component, it is more flexible than the underlying electrode layer 53, which is a baked layer of a conductive paste or a thin film layer, for example. Accordingly, when the chip-shaped electronic component 41 receives a physical impact, an impact resulting from a heat cycle, or the like, the intermediate electrode layer 55 defines and functions as a buffer layer, and is able to significantly reduce or prevent cracking in the chip-shaped electronic component 41.

Specific examples of the thermosetting resin included in the conductive resin defining the intermediate electrode layer 55 various thermosetting resins, for example, epoxy resin, phenol resin, urethane resin, silicone resin, and polyimide resin. Preferably, an epoxy resin is included as the thermosetting resin, for example, due to its properties of heat resistance, moisture resistance, adhesiveness, and the like.

Furthermore, the conductive resin defining the intermediate electrode layer 55 preferably include a curing agent together with the thermosetting resin, for example. When an epoxy resin is included as a base resin, then as a curing agent for epoxy resin, various compounds are able to be included, for example, phenol-, amine-, acid anhydride- and imidazole-based compounds.

The metal component included in the conductive resin defining the intermediate electrode layer 55 is preferably provided in the form of powder, for example. The metal component may include, for example, a single type of metal powder or a plurality of types of metal powder. Furthermore, the metal powder may be formed of a single type of metal or two or more types of metals.

For example, when the metal component included in the conductive resin is a single type of metal powder, preferably, Ag powder, or metal powder in which base metal particles have their surfaces coated with Ag, is included. Ag has the lowest specific resistance among metals and is thus preferably included as a material of an electrode, and furthermore, since Ag is a precious metal, it does not oxidize, and is thus resistant to weather. Furthermore, Ag-coated metal powder allows an inexpensive matrix metal to be included while maintaining Ag's properties, thus reducing cost.

The intermediate electrode layer 55 is formed, for example, via the step shown in FIG. 2. The ceramic body 42 including the underlying electrode layer 53 formed thereon is held by a holder 57 in a tilted position, as shown in FIG. 2. The conductive resin is prepared as a conductive resin liquid 58 in which a thermosetting resin included therein is not in a cured state. The ceramic body 42, held by the holder 57, has a lower end immersed in and thus provided with the conductive resin liquid 58. A similar step is applied to the other end of the ceramic body 42. Subsequently, when the conductive resin liquid 58 is cured, the intermediate electrode layer 55 is formed as shown in FIG. 1B.

As shown in FIG. 1C, the external electrode layer 54 covers an area in which at least one of the underlying electrode layer 53 and the intermediate electrode layer 55 is formed. Accordingly, the external electrode layer 54 is in surface-contact with the underlying electrode layer 53 at the exposed surface 56 exposed in the underlying electrode layer 53 from the intermediate electrode layer 55. In the first preferred embodiment, the exposed surface 56 of the underlying electrode layer 53 is at least partially provided at portions located on the first and second side surfaces 45 and 46, respectively, and the underlying electrode layer 53 is in surface-contact with the external electrode layer 54 on the first and second side surfaces 45 and 46.

Furthermore, as a material defining the external electrode layer 54, as well as a material defining the underlying electrode layer 53, as described above, a material lower in electrical resistivity than the conductive resin defining the intermediate electrode layer 55 is selected. Accordingly, bringing the external electrode layer 54 into surface-contact with the underlying electrode layer 53 is able to reduce electrical resistance in a current path passing through the external electrodes 51 and 52, and hence reduce the equivalent series resistance of the chip-shaped electronic component 41.

The external electrode layer 54 is preferably a plating layer. When the external electrode layer 54 is formed by plating, the external electrode layer 54 preferably covers an area in which at least one of the underlying electrode layer 53 and the intermediate electrode layer 55 is formed, for example.

The plating layer includes a metal, which is, for example, at least one selected from Cu, Ni, Ag, Pd, an Ag—Pd alloy, Au. The plating layer may include a plurality of layers.

Preferably, a 2-layer structure which includes a Ni plating layer and a Sn plating layer thereon is provided. The Ni plating layer significantly reduces or prevents a solder applied during mounting of the chip-shaped electronic component 41 from eroding the underlying electrode layer 53 and the intermediate electrode layer 55. The Sn plating layer on the Ni plating layer enhances wettability of the solder used in mounting the chip-shaped electronic component 41, and thus allows the mounting process to be efficiently performed and the chip-shaped electronic component to be reliably mounted. Preferably, the plating layer has a thickness of about 1 μm or more and about 15 μm or less per single layer, for example.

As long as the external electrode layer 54 is in surface-contact with the underlying electrode layer 53, the external electrode layer 54 is not required to cover the area in which at least one of the underlying electrode layer 53 and the intermediate electrode layer 55 is provided, as discussed above. Therefore, according to the first preferred embodiment, the external electrode layer 54, for example, may not be provided in an area covering the first main surface 43 or it may be arranged to not cover a portion of the intermediate electrode layer 55.

Furthermore, in the first preferred embodiment, each of the portions of the intermediate electrode layer 55 extending to the portions, respectively, of each of the first and second side surfaces 45 and 46 which are adjacent to or in a vicinity of the first and second end surfaces 47 and 48, respectively, includes a long portion, as measured in the direction connecting the first and second end surfaces 47 and 48, that projects from the underlying electrode layer 53. According to this configuration, the external electrodes 51 and 52 each have an unsymmetrical shape, and the surface of the ceramic body 42 corresponding to the second main surface 44 is able to be easily determined by visual observation of the external electrodes 51 and 52. Thus, a surface that is desired to face the mounting substrate is able to be determined quickly and reliably in the step of mounting the chip-shaped electronic component 41.

Second Preferred Embodiment

Figure 3A:
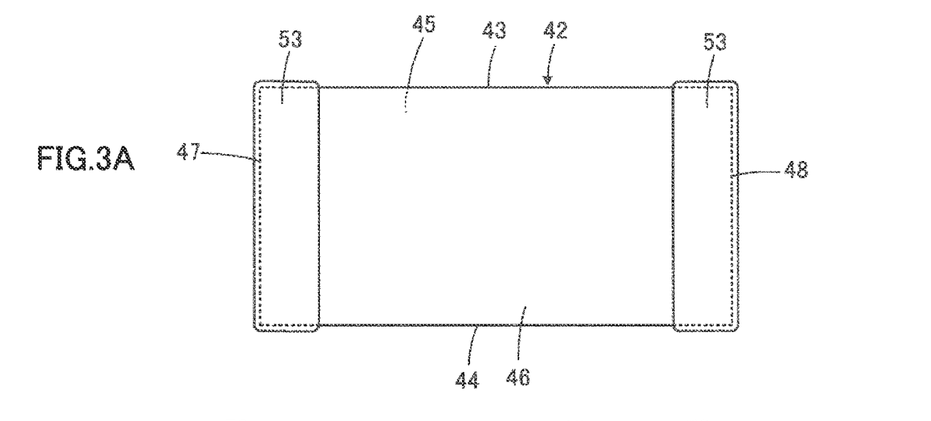
FIGS. 3A to 3C are side views of a chip-shaped electronic component according to a second preferred embodiment of the present invention, and show a process for forming external electrodes of the chip-shaped electronic component.

With reference to FIG. 3A to FIG. 5, a chip-shaped electronic component 41a according to a second preferred embodiment of the present invention is described below. FIGS. 3A and 3B show states in a process of producing the chip-shaped electronic component 41a, and FIG. 3C shows the chip-shaped electronic component 41a as a finished product. In FIG. 3A to FIG. 5, elements equivalent to those shown in FIG. 1A to FIG. 2 described above are similarly labeled and description thereof is not repeated.

The chip-shaped electronic component 41a includes a ceramic body 42 similar to the ceramic body 42 included in the chip-shaped electronic component 41 described with respect to the first preferred embodiment. Accordingly, the ceramic body 42 included in the chip-shaped electronic component 41a of the second preferred embodiment is also provided with internal electrodes 23 and 24 (see, for example, FIG. 1A), which are not shown in FIGS. 3A to 3C.

Figure 3B:
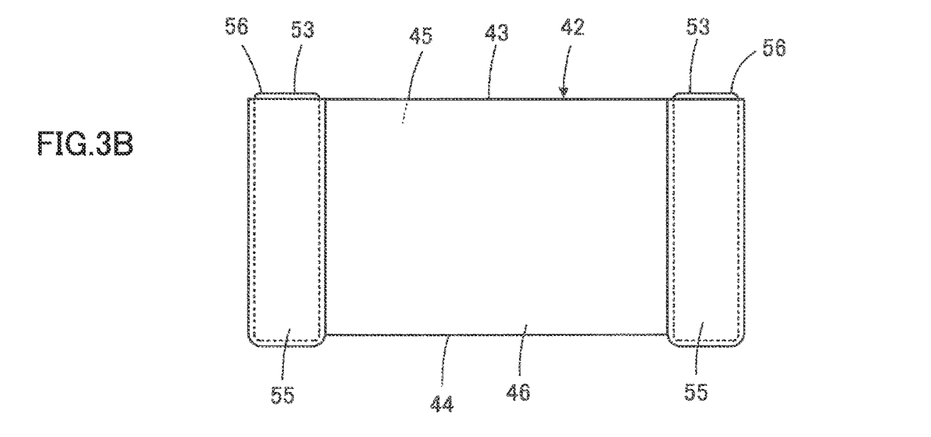
Figure 3C:
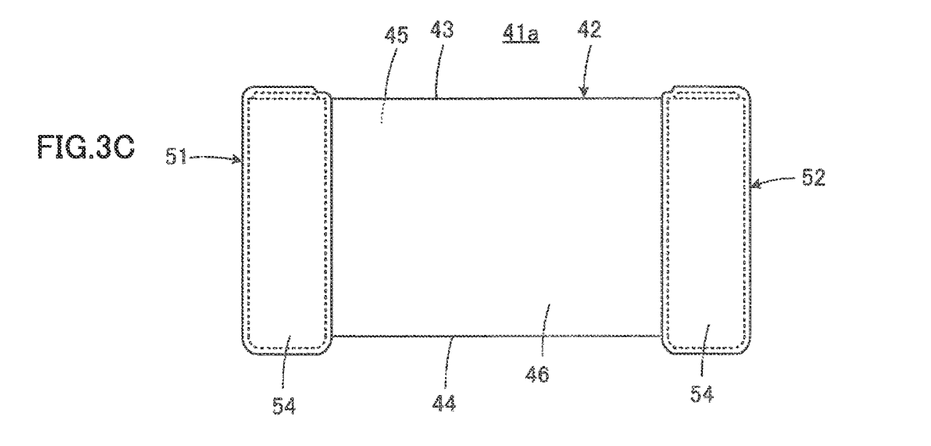

FIG. 3A shows a state after the underlying electrode layer 53 is formed, FIG. 3B shows a state after the intermediate electrode layer 55 is formed outside the underlying electrode layer 53, and FIG. 3C shows a state after the external electrode layer 54 is formed outside the underlying electrode layer 53 and the intermediate electrode layer 55.

Initially, the underlying electrode layer 53 shown in FIG. 3A is similar to the underlying electrode layer 53 included in the chip-shaped electronic component 41 of the first preferred embodiment. Accordingly, the description regarding underlying electrode layer 53 quotes the description regarding underlying electrode layer 53 in chip-shaped electronic component 41 described with respect to the first preferred embodiment.

As shown in FIG. 3B, the intermediate electrode layer 55 entirely or substantially entirely covers each of the first and second end surfaces 47 and 48. Furthermore, the intermediate electrode layer 55 extends from the first and second end surfaces 47 and 48 to portions, respectively, of the second main surface 44 and also to extend from the first and second end surfaces 47 and 48 to portions, respectively, of each of the first and second side surfaces 45 and 46 that are adjacent to or in a vicinity of the first and second end surfaces 47 and 48, respectively.

Figure 4:
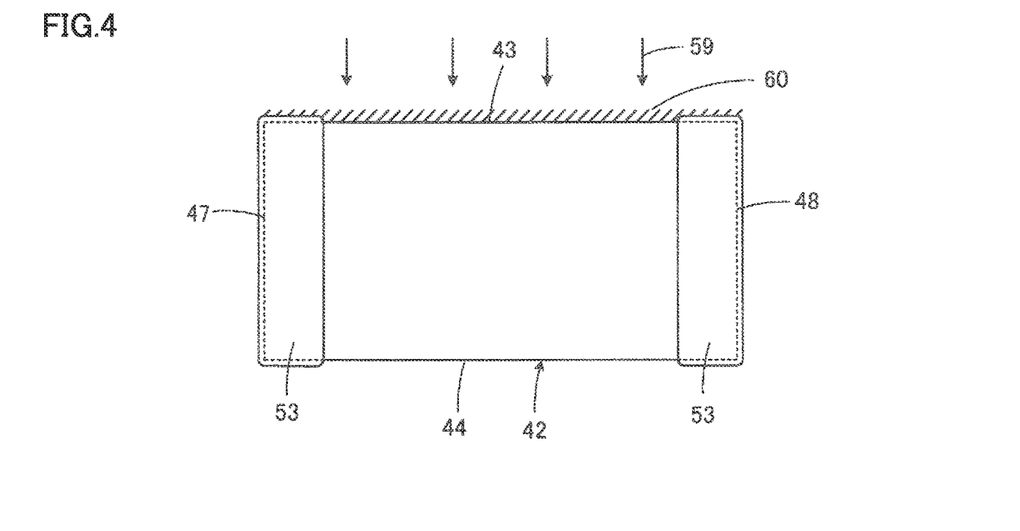
FIG. 4 is a side view showing a water repellency step implemented to form an intermediate electrode layer on a ceramic body shown in FIG. 3B.
Figure 5:
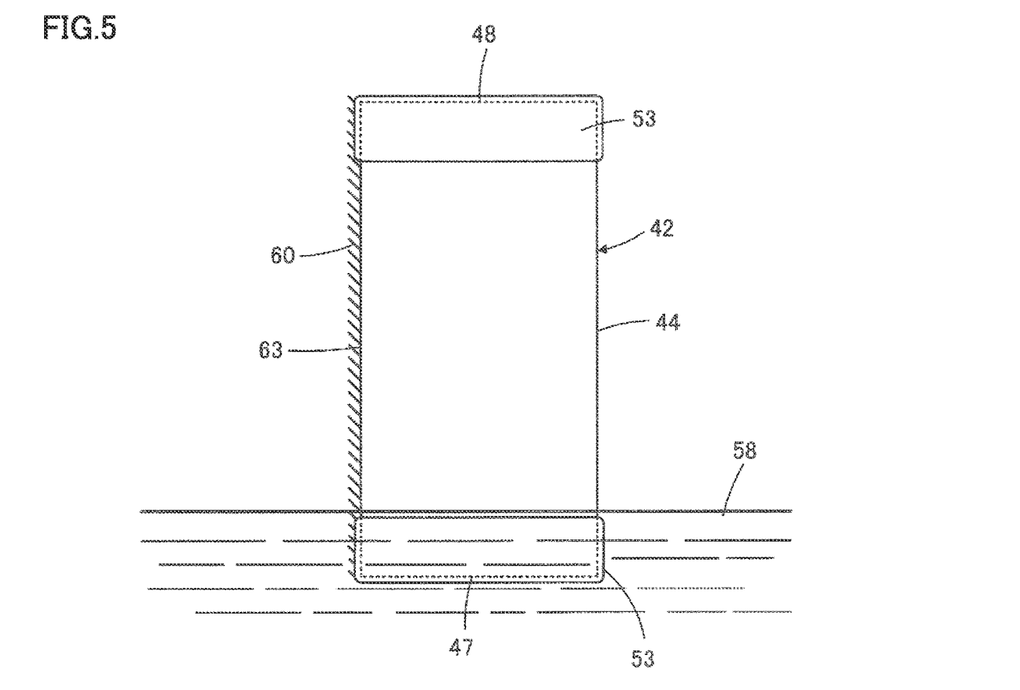
FIG. 5 is a side view showing an immersion step implemented to form the intermediate electrode layer on the ceramic body having undergone the water repellency step shown in FIG. 4.

In the second preferred embodiment, the intermediate electrode layer 55 does not cover the first major surface 43. To form the intermediate electrode layer 55, for example, as indicated in FIG. 4 by an arrow 59, the first main surface 43 of the ceramic body 42 is subjected to a water repellency treatment to form a water repellent film 60. Then, as shown in FIG. 5, an end of the first end surface 47 of the ceramic body 42 is immersed in and thus provided with the conductive resin liquid 58. At this time, the conductive resin liquid 58 is not provided to the surface including the water repellent film 60 formed thereon. The same or a similar step is applied to an end of the second end surface 48 of the ceramic body 42. Subsequently, when the conductive resin liquid 58 is cured, the intermediate electrode layer 55 is formed, as shown in FIG. 3B.

Thus, the intermediate electrode layer 55 is formed without covering the first main surface 43. More specifically, the exposed surface 56, which is exposed in the underlying electrode layer 53 from the intermediate electrode layer 55, is provided on the side of first main surface 43. As described herein, a process for repelling the conductive resin liquid 58 is referred to as a water repellency treatment. Preferably, the water repellency treatment is not limited to only repelling water or an aqueous solution, for example.

The external electrode layer 54 is formed, for example, of a plating layer. As shown in FIG. 3C, the external electrode layer 54 covers an area in which at least one of the underlying electrode layer 53 and the intermediate electrode layer 55 is formed. Accordingly, the external electrode layer 54 is in surface-contact with the underlying electrode layer 53 at the exposed surface 56, which is exposed in the underlying electrode layer 53 from the intermediate electrode layer 55. In the second preferred embodiment, the exposed surface 56 of the underlying electrode layer 53 is provided at a portion located on the first main surface 43, and the underlying electrode layer 53 is in surface-contact with the external electrode layer 54 on the first main surface 43.

Third Preferred Embodiment

With reference to FIG. 6A1 to FIG. 7B, a chip-shaped electronic component 41b according to a third preferred embodiment of the present invention is described below. FIGS. 6A1 and 6A2, and 6B show states in a process of producing the chip-shaped electronic component 41b, and FIG. 6C shows the chip-shaped electronic component 41b as a finished product. In FIG. 6A1 to FIG. 7B, elements equivalent to those shown in FIG. 1A to FIG. 2 described above are similarly labeled and description thereof is not repeated.

The chip-shaped electronic component 41b includes a ceramic body 42 similar to the ceramic body 42 included in the chip-shaped electronic component 41 described with respect to the first preferred embodiment. Accordingly, the ceramic body 42 included in the chip-shaped electronic component 41b of the second preferred embodiment is also provided with internal electrodes 23 and 24 (see, for example, FIG. 1A). The first internal electrode 49, which is drawn out to the first end surface 47, is indicated in FIG. 6A2 by a broken line.

Figure 6A:
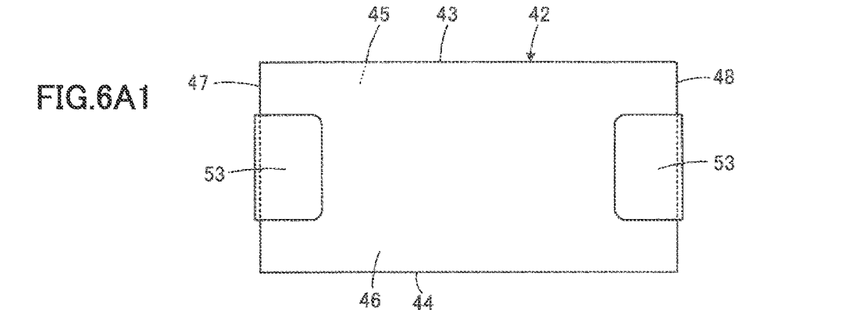
Figure 6A:
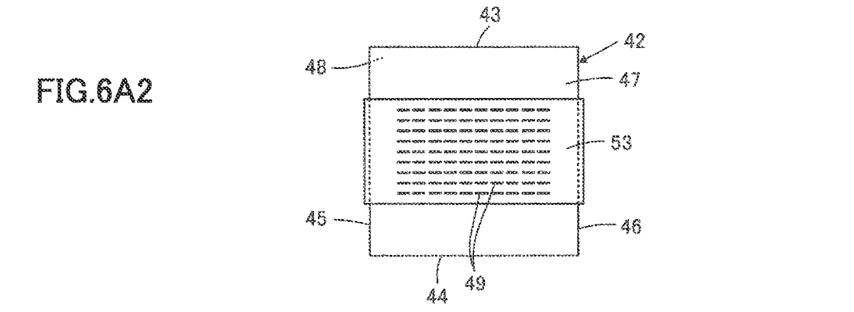
Figure 6B:
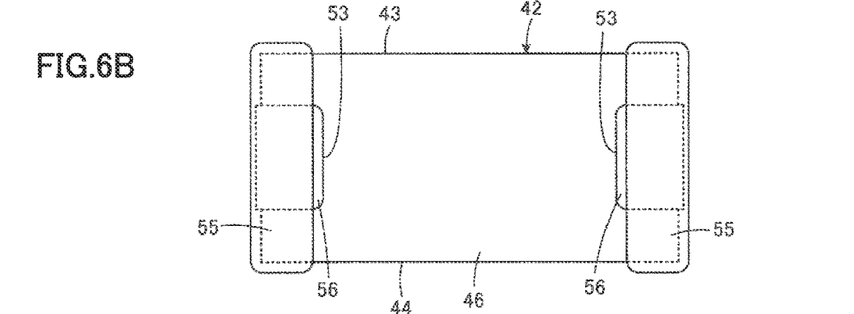
Figure 6C:
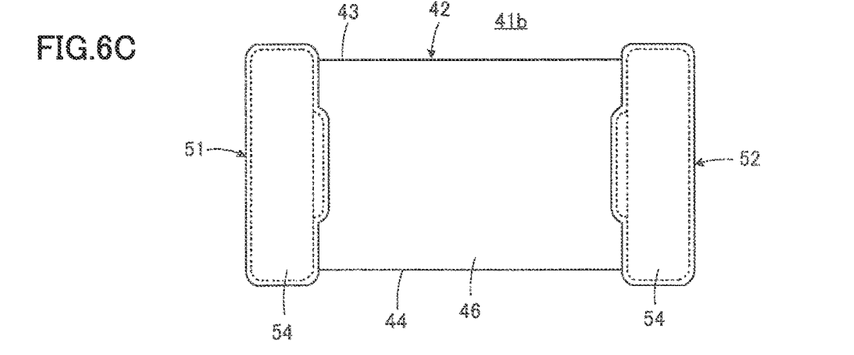

FIGS. 6A1 and 6A2 show a state after the underlying electrode layer 53 is formed, as observed on the side of the side surface 46 and the side of the end surface 47, respectively. FIG. 6B shows a state after the intermediate electrode layer 55 is formed outside the underlying electrode layer 53, as observed on the side of the side surface 46. FIG. 6C shows a state after the external electrode layer 54 is formed outside the underlying electrode layer 53 and the intermediate electrode layer 55, as observed on the side of the side surface 46.

As shown in FIGS. 6A1 and 6A2, the underlying electrode layer 53 extends from the first and second end surfaces 47 and 48 to portions of each of the first and second side surfaces 45 and 46 that are adjacent to or in a vicinity of the first and second end surfaces 47 and 48, respectively. The underlying electrode layer 53, which is electrically connected to each of the internal electrodes 49 and 50, includes a width that provides an electrical connection to each of the internal electrodes 49 and 50, as shown in FIG. 6A2 for the first internal electrode 49. In the third preferred embodiment, the underlying electrode layer 53 preferably has a width that is shorter than a distance between the first and second main surfaces 43 and 44.

Figure 7A:
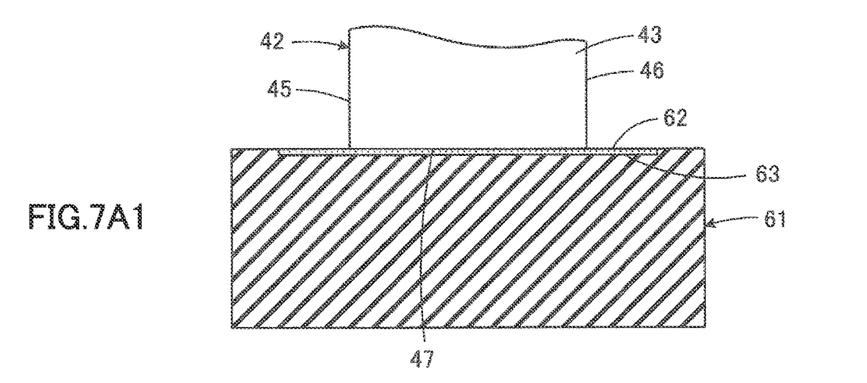
Figure 7A:
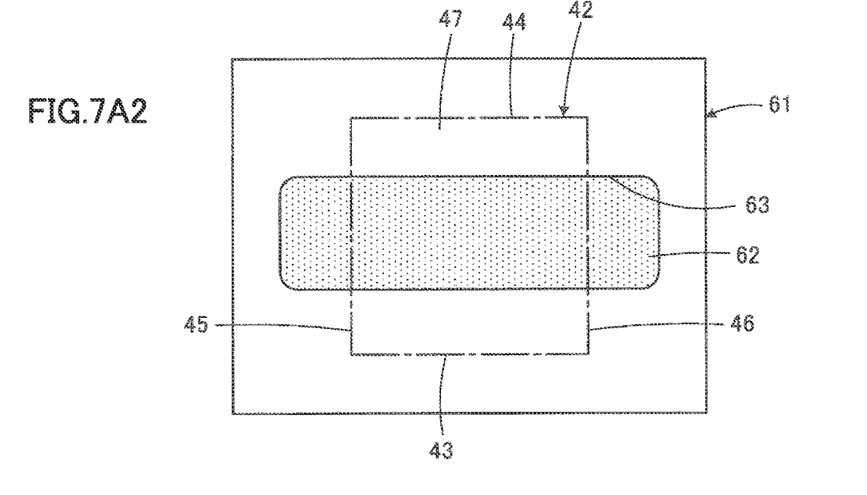

In the third preferred embodiment, the underlying electrode layer 53 is a baked layer. A process for forming the underlying electrode layer 53 is implemented as shown in FIGS. 7A1 to 7B.

Initially, as shown in FIGS. 7A1 and 7A2, an application table 61 defined by an elastic body, for example, rubber, is prepared. The application table 61 is provided with a recess 63 to receive the conductive paste 62.

Subsequently, the first end surface 47 of ceramic body 42 is positioned with respect to the recess 63 of the application table 61, as shown in FIGS. 7A1 and 7A2.

Figure 7B:
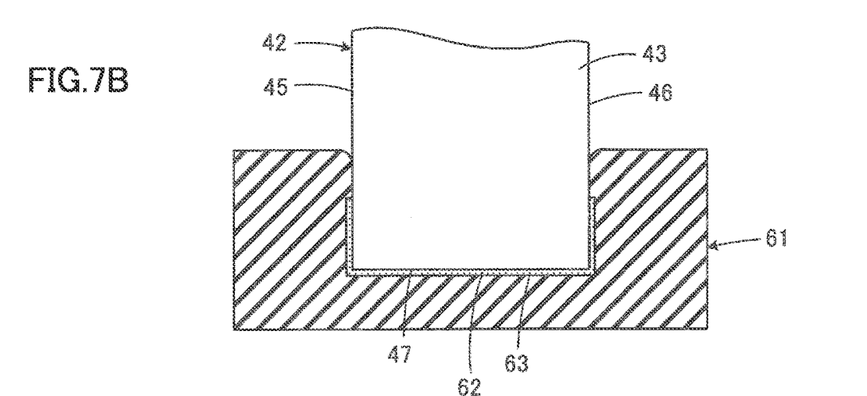
FIG. 7B shows a second step performed after the first step, as observed from the side of the main surface.

Subsequently, as shown in FIG. 7B, the ceramic body 42 is pressed toward the application table 61. The application table 61 is deformed along an external surface of the ceramic body 42 and the conductive paste 62 included in recess 63 is applied from the first end surface 47 of the ceramic body 42 to a portion of each of the first and second side surfaces 45 and 46 adjacent to or in a vicinity of the first end surface 47.

Subsequently, the above-described process is also applied on the side of the second end surface 48 of the ceramic body 42. The step of baking conductive paste 62 is then performed, and the underlying electrode layer 53 is formed.

As shown in FIG. 6B, the intermediate electrode layer 55 entirely or substantially entirely covers each of the first and second end surfaces 47 and 48. Furthermore, the intermediate electrode layer 55 extends from the first and second end surfaces 47 and 48 to portions, respectively, of the second main surface 44 and also to extend from the first and second end surfaces 47 and 48 to portions, respectively, of each of the first and second side surfaces 45 and 46 that are adjacent to or in a vicinity of the first and second end surfaces 47 and 48, respectively.

The intermediate electrode layer 55 is formed via the step of immersing an end of the ceramic body 42 in a conductive resin liquid, for example. Accordingly, a portion of the intermediate electrode layer 55 extending to a portion of each of the first and second side surfaces 45 and 46, as described above, is formed, and the exposed surface 56 is able to remain at an end of the underlying electrode layer 53.

As shown in FIG. 6C, the external electrode layer 54 covers an area in which at least one of the underlying electrode layer 53 and the intermediate electrode layer 55 is formed. Accordingly, the external electrode layer 54 is in surface-contact with the underlying electrode layer 53 at the exposed surface 56, which is exposed in the underlying electrode layer 53 from the intermediate electrode layer 55. In the third preferred embodiment, the exposed surface 56 of the underlying electrode layer 53 is provided at portions located on the first and second side surfaces 45 and 46, respectively, and the underlying electrode layer 53 is in surface-contact with the external electrode layer 54 on the first and second side surfaces 45 and 46.

Fourth Preferred Embodiment

A fourth preferred embodiment of the present invention is described below with reference to FIG. 8A and FIG. 8B. The fourth preferred embodiment is an example of a modification to the process of forming the underlying electrode layer 53 according to the third preferred embodiment.

Figure 8A:
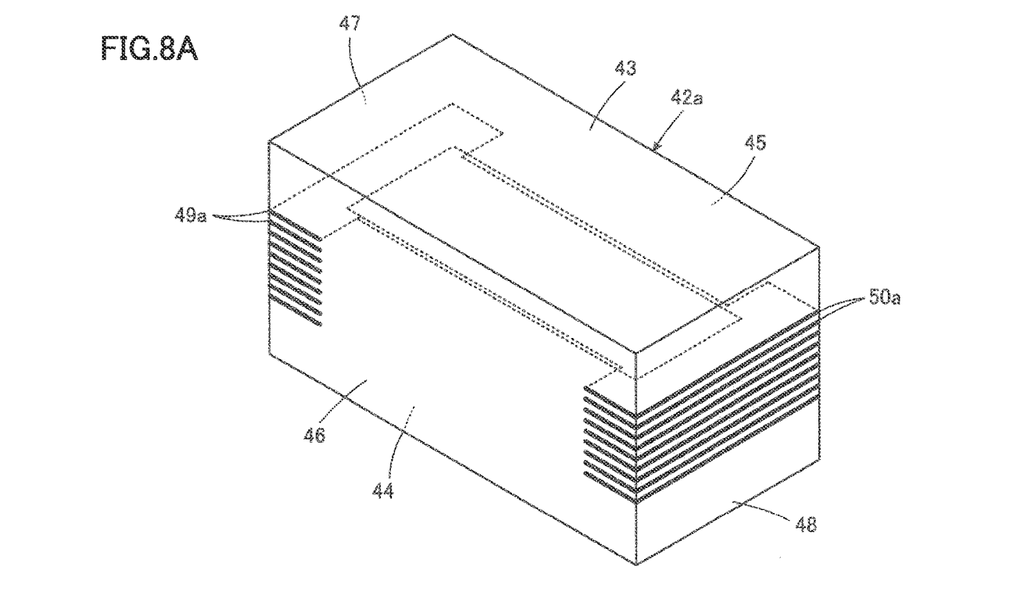
FIG. 8A is a perspective view of the ceramic body before the underlying electrode layer is formed.
Figure 8B:
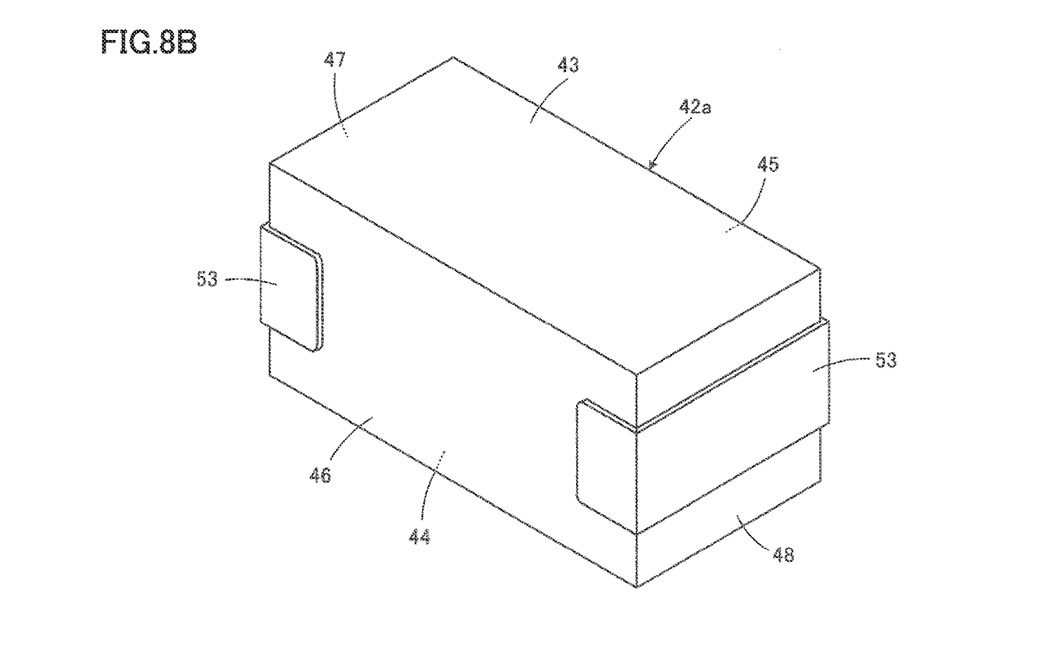
FIG. 8B is a perspective view of the ceramic body after the underlying electrode layer is formed.

In the fourth preferred embodiment, a ceramic body 42a includes first and second internal electrodes 49a and 50a, as shown in FIG. 8A. The internal electrodes 49a and 50a are drawn out across the entire or substantially the entire widths of the end surfaces 47 and 48, respectively, of ceramic body 42a, and are also drawn out at portions, respectively, of each of the side surfaces 45 and 46.

The underlying electrode layer 53 is formed by the plating ceramic body 42a. More specifically, when the ceramic body 42a is, for example, electroplated, then, as shown in FIG. 8A, edges of the internal electrodes 49a and 50a that are exposed at an external surface of the ceramic body 42a define and function as a starting point to grow plating. Accordingly, as shown in FIG. 8B, the underlying electrode layer 53 including a plating layer is formed.

The underlying electrode layer 53 of the fourth preferred embodiment, similar to the underlying electrode layer 53 of the third preferred embodiment, extends from the first and second end surfaces 47 and 48 to portions, respectively, of each of the first and second side surfaces 45 and 46 that are adjacent to or in a vicinity of first and second end surfaces 47 and 48, respectively. Furthermore, according to the formation method described above, the underlying electrode layer 53 is electrically connected to each of the internal electrodes 49 and 50. Furthermore, the underlying electrode layer 53, as well as the underlying electrode layer 53 in the third preferred embodiment, preferably has a width that is shorter than a distance between the first and second main surfaces 43 and 44.

Subsequently, the intermediate electrode layer 55 and the external electrode layer 54 are formed, similar to the third preferred embodiment described above.

While the present invention has been specifically described in the first preferred embodiment, and certain aspects and features of the second to fourth preferred embodiments have not been described, the description of the first preferred embodiment is applicable to the second to fourth preferred embodiments unless otherwise indicated.

Furthermore, while in the first preferred embodiment a surface of the chip-shaped electronic component 41 that faces a mounting substrate is able to be determined based on the shapes of the external electrodes 51 and 52, in the second to fourth preferred embodiments, it is preferable that a mark be provided on an external surface of the chip-shaped electronic component to help to determine the surface to face the mounting substrate, for example.

The preferred embodiments described above are illustrative and different preferred embodiments are able to have their configurations partially substituted with each other or combined together.

Furthermore, while the above preferred embodiments provide a multilayer ceramic capacitor as an example of a chip-shaped electronic component, the chip-shaped electronic component may be an electronic component having a different function, structure, or features. Accordingly, the ceramic body is not particularly limited to a multilayer structure in which a plurality of internal conductors are disposed in layers, and, for example, the ceramic body may be simply provided with an internal conductor that is electrically connected to an external electrode.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A chip-shaped electronic component comprising:
a ceramic body with a rectangular parallelepiped or a substantially rectangular parallelepiped shape including mutually opposite first and second main surfaces, mutually opposite first and second side surfaces, and mutually opposite first and second end surfaces;
an internal conductor provided inside the ceramic body; and
first and second external electrodes on the first and second end surfaces, respectively, of the ceramic body and extend from the first and second end surfaces, respectively, to at least the second main surface adjacent to or in a vicinity of the first and second end surfaces, respectively; wherein
the second main surface is a surface that faces a mounting substrate when the chip-shaped electronic component is mounted to the mounting substrate;
each of the first and second main surfaces, each of the first and second side surfaces, and each of the first and second end surfaces are orthogonal or substantially orthogonal to one another;
each of the first and second external electrodes includes an underlying electrode layer provided at least on the first and second end surfaces, respectively, of the ceramic body and electrically connected to the internal conductor, an external electrode layer located outside the underlying electrode layer, and an intermediate electrode layer including at least a portion located between the underlying electrode layer and the external electrode layer;
the intermediate electrode layer includes a conductive resin including a resin component and a conductive metal component;
the underlying electrode layer and the external electrode layer include a material lower in electrical resistivity than the conductive resin;
the intermediate electrode layer entirely or substantially entirely covers each of the first and second end surfaces and extends from the first and second end surfaces to portions, respectively, of at least the second main surface;
the underlying electrode layer is partially exposed from the intermediate electrode layer to include an exposed surface, and the underlying electrode layer is in surface-contact with the external electrode layer at the exposed surface;
the underlying electrode layer extends from the first and second end surfaces to portions, respectively, of each of the first and second side surfaces that are adjacent to or in a vicinity of the first and second end surfaces, respectively;
the intermediate electrode layer extends from the first and second end surfaces to the portions, respectively, of each of the first and second side surfaces that are adjacent to or in a vicinity of the first and second end surfaces, respectively; and the exposed surface of the underlying electrode layer is at least partially provided at portions located on the first and second side surfaces, respectively, and the underlying electrode layer is in surface-contact with the external electrode layer on the first and second side surfaces.

2. The chip-shaped electronic component according to claim 1, wherein the underlying electrode layer is a baked layer or a thin film layer.

3. The chip-shaped electronic component according to claim 1, wherein the external electrode layer is a plating layer.

4. The chip-shaped electronic component according to claim 3, wherein the external electrode layer covers an area in which at least one of the underlying electrode layer and the intermediate electrode layer is located.

5. The chip-shaped electronic component according to claim 1, wherein the ceramic body includes a multilayer structure in which a plurality of internal conductors are disposed in layers.

6. The chip-shaped electronic component according to claim 1, wherein portions of the intermediate electrode layer extending to the portions, respectively, of each of the first and second side surfaces each include a width, as measured in a direction connecting the first and second end surfaces, that increases in a direction from the first main surface toward the second main surface.

7. The chip-shaped electronic component according to claim 6, wherein the portions of the intermediate electrode layer extending to the portions, respectively, of each of the first and second side surfaces each includes an elongated portion, as measured in a direction connecting the first and second end surfaces, that projects from the underlying electrode layer.

8. The chip-shaped electronic component according to claim 1, wherein:
the underlying electrode layer extends from the first and second end surfaces to portions, respectively, of the first main surface that are adjacent to or in a vicinity of the first and second end surfaces, respectively; and
the exposed surface of the underlying electrode layer is at least partially provided at a portion located on the first main surface, and the underlying electrode layer is in surface-contact with the external electrode layer on the first main surface.

9. The chip-shaped electronic component according to claim 2, wherein the underlying electrode layer includes a plurality of layers.

10. The chip-shaped electronic component according to claim 2, wherein the underlying electrode layer has a thickness of about 1 µm or less.

11. The chip-shaped electronic component according to claim 5, wherein:
the plurality of internal conductors includes a plurality of first internal conductors and a plurality of second internal conductors alternately disposed in a direction in which the layers are stacked; and
the plurality of first internal conductors is electrically connected to the first end surface, and the plurality of second internal conductors is electrically connected to the second end surface.

12. The chip-shaped electronic component according to claim 6, wherein the portions of the intermediate electrode layer extending to the portions, respectively, of each of the first and second side surfaces defines a right-angled or substantially right-angled triangle.

13. The chip-shaped electronic component according to claim 1, wherein the conductive resin of the intermediate electrode layer includes a thermosetting resin and a curing agent.

14. The chip-shaped electronic component according to claim 1, wherein the conductive metal component includes at least one metal powder.

15. The chip-shaped electronic component according to claim 14, wherein the at least one type of metal powder includes an average particle diameter of about 0.3 µm or more and about 10 µm or less.

16. The chip-shaped electronic component according to claim 14, wherein the at least one metal powder includes an Ag powder or an Ag-coated metal powder.

17. The chip-shaped electronic component according to claim 3, wherein the plating layer includes a plurality of layers.

18. The chip-shaped electronic component according to claim 17, wherein the plurality of layers of the plating layer include a Ni plating layer and a Sn plating layer.

19. The chip-shaped electronic component according to claim 17, wherein each of the plurality of layers of the plating layer has a thickness of about 1 µm or more and about 15 µm or less.

* * * * *